July 17, 1962 J. P. BRUCK 3,044,223
PORTABLE SANDER WITH DETACHABLE HANDLE AND CONTROLS
Filed May 27, 1960 2 Sheets-Sheet 1
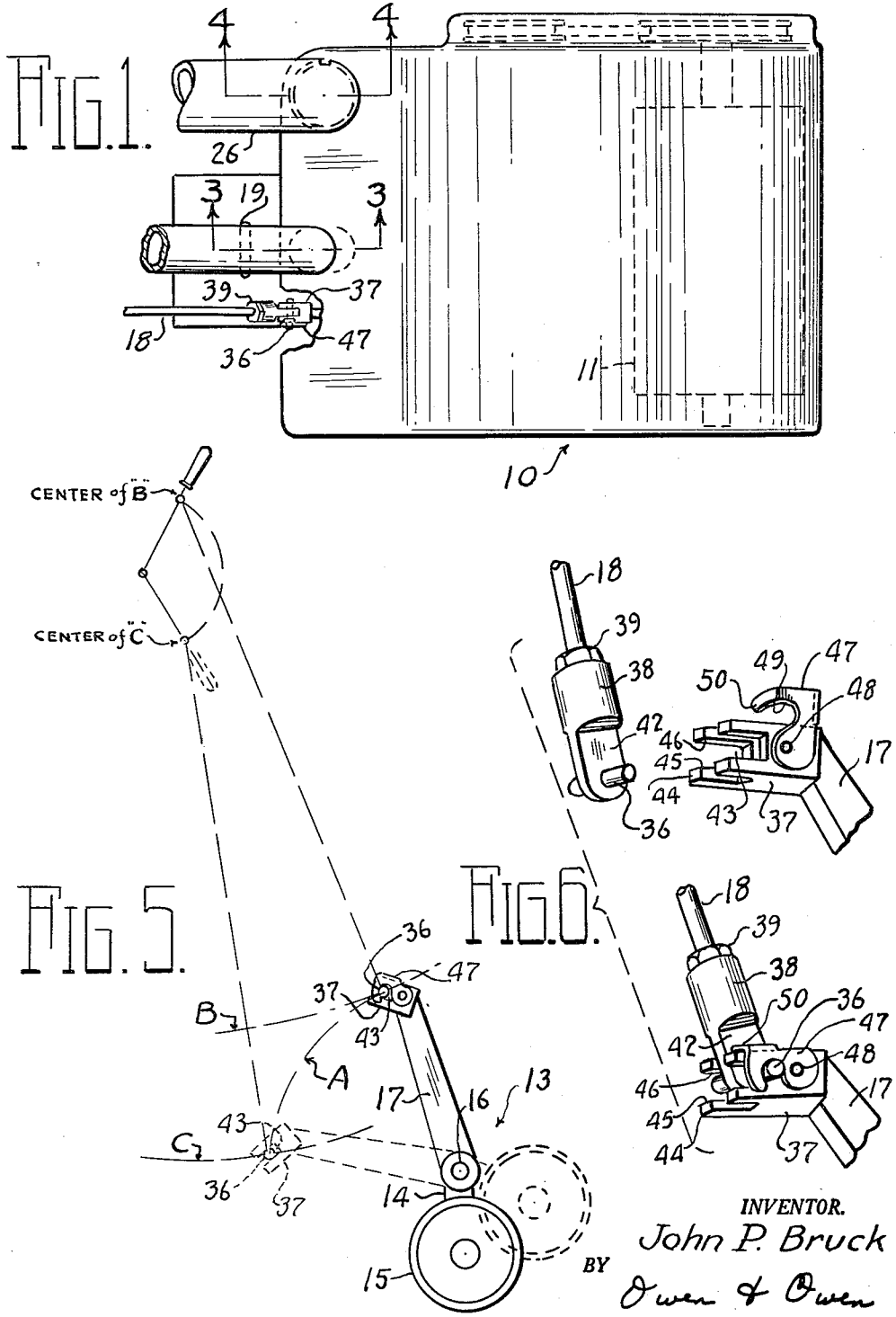
INVENTOR.
John P. Bruck
BY Owen & Owen
ATTORNEYS

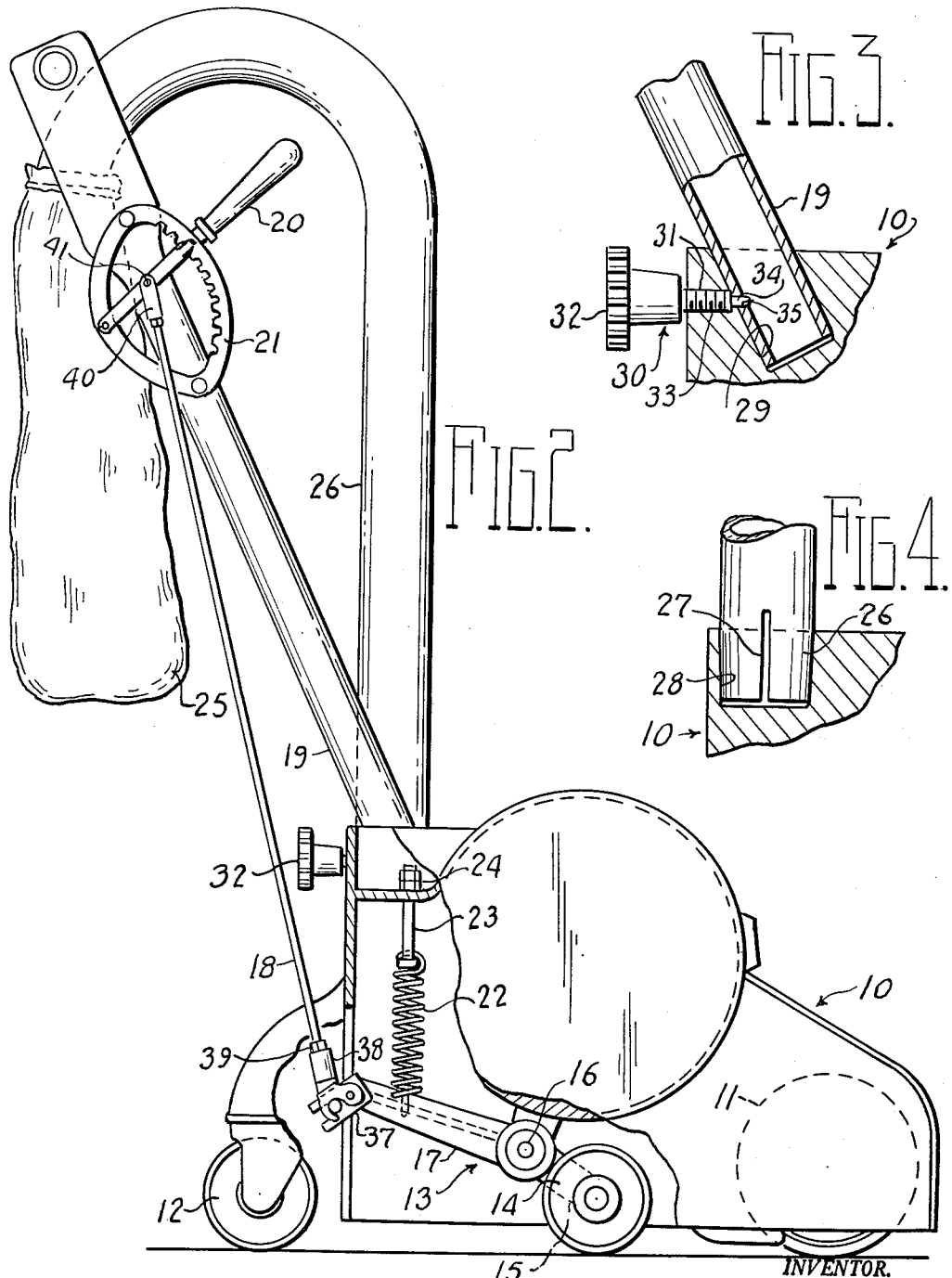

United States Patent Office 3,044,223
Patented July 17, 1962

3,044,223
PORTABLE SANDER WITH DETACHABLE
HANDLE AND CONTROLS
John P. Bruck, Toledo, Ohio, assignor to The American-Lincoln Corporation, Toledo, Ohio, a corporation of Ohio
Filed May 27, 1960, Ser. No. 32,233
3 Claims. (Cl. 51—176)

This invention relates to machines adapted for sanding, abrading, polishing, or scrubbing surfaces and, more particularly, to portable sanding machines of the electric motor operated type, constructed to be steered and controlled by a walking attendant.

Portable sanders are generally characterized by a generally common structural arrangement involving a vertically tiltable motor-carrying frame or housing which mounts a front horizontal, rotary surfacing drum, a single swivelly mounted caster at the rear of the housing, and a manually regulated adjusting and transporting wheeled truck on the housing between the drum and the caster. An operating push handle is provided which is customarily fixed to the rear of the body housing so that the machine may be guided in its movements by the attendant. A hand controlled lever on the upper end of the handle is connected by means of a push rod or link to the customary control arm of the wheeled truck in such a manner that an application of a downward pressure on the lever handle will raise the truck wheel and reduce its pressure on the floor, which in turn permits an increase, by gravity action, of the abrading pressure of the drum.

The handle and rod, as well as other appurtenances, such as a goose neck for a dust bag which extends from the body housing make the machine difficult to handle when it was necessary to move from one work site to another. Various attempts were made in the prior art machines to provide removable handles for portable sanders. For example, a United States Patent No. 2,327,229 discloses such a device in which the handle carries a forked lug that is retained in a mating slot in the body housing.

Although such devices proved to be satisfactory when only a handle had to be detachably mounted on the body housing, these devices did not operate satisfactorily when a rod was attached to both the wheeled truck and the handle because any attempt to make both the handle and the rod easily removable from their respective parts resulted in connections which would loosen and become disconnected when the sander was in operation. When such attempts were made to make the connections more positive, they were extremely difficult to disconnect and consequently were undesirable.

It is, therefore, the object of the present invention to provide in a machine of the class described a simple, novel and efficient means for attaching all appurtenances to the machine body in a manner to permit easy and quick engagement with or disengagement from the body.

Another object of the invention is the provision of a novel mounting of a pressure applying member on the control arm of the wheeled truck which permits the pressure applying member to be quickly and easily detached from the control arm.

Other objects and advantages of the invention will be apparent from the following detailed description, and from the accompanying drawings wherein like numbers are used throughout to identify like parts.

FIG. 1 is a partial plan view of a floor sanding device embodying the invention;

FIG. 2 is a side elevation with parts broken away showing the pressure adjusting truck wheels in their normal operating position;

FIG. 3 is an enlarged fragmentary elevation view taken along the line 3—3 of FIG 1;

FIG. 4 is an enlarged fragmentary elevation view taken along the line 4—4 of FIG. 1;

FIG. 5 is a diagrammatic view showing the relative positions of the control lever, handle, push rod, and truck control arm at the completely extended and retracted positions; and FIG. 6 is a perspective detail view of two positions of the yoke and pin assembly which selectively connects the pressure rod to the control arm.

Referring to the drawings, there is shown in FIGS. 1 and 2 a body housing 10 which carrier and electric motor for rotating a horizontally extending sanding drum 11 which is normally in contact with a surface to be sanded and exerts a pressure thereagainst. The customary sanding drum 11 is mounted along the forward end of the body housing 10 with its axis transverse thereof, and at the rear of the housing 10 is a swivelly mounted caster wheel 12 which likewise is in contact with the surface to be sanded.

A truck 13 is likewise carried by the body housing 10 in advance of the swivel caster 12 and between the swivel caster 12 and the sanding drum 11. The weight of the sander is carried by the sanding drum 11, swivel caster 12 and the truck 13, and, as is well known in the art, the truck 13 is mounted for movement relative to the body housing 10 toward and away from the surface to be sanded. Wheels 14 mounted on the truck 13 act as stabilizers to prevent sideways skidding of the sander while sanding with the grain of the wood. The amount of pressure applied to the wheels 14 to prevent this skidding is adjustable and is imparted by suitable resilient means.

The truck 13 comprises two spaced downwardly directed rocker arms 15 carrying the wheels 14 at their lower ends and mounted at their upper ends on a cross shaft 16 for vertical rocking action. The shaft 16 is mounted at its ends in the body housing 10 and its axis is parallel to the axes of the wheels 14.

Manual movement of the truck 13 is accomplished through a control arm 17 which extends rearwardly from and is a part of the truck 13. At its rear end the arm 17 is connected to a force transmitting member in the form of a push rod 18 in a manner which will be described later in greater detail, and the push rod 18 extends outwardly and upwardly along a handle 19 which is used by the attendant to guide the floor sander.

The push rod 18 is connected at its upper end to a shifting lever 20 pivoted on the handle 19. The shifting lever 20 is pivotally carried by the upper end portion of the handle 19 transversely thereof and has releasable engagement with the notched quadrant 21 carried by the handle 19 in a manner well known in the art. It is evident that a downward movement on the outer end of the lever 20 will impart an upward movement to the truck wheels 14 and that raising of such a lever will cause the lowering of the truck wheels. When it is desired to lift the sanding drum 11 out of contact with the surface to be sanded, the lever 20 is moved to its uppermost position so that the truck wheels 14 are moved downwardly.

A resilient force is applied to the control arm 17 by means of a suitable spring 22 which moves the wheels 14 in the direction of the surface to be sanded, thereby maintaining the latter in contact with this surface. As shown most clearly in FIG. 2, one end of the spring 22 is connected to the control arm 17 while the other end is secured to the body housing 10 by means of an adjusting screw 23 which extends through a suitable aperture in the body housing 10. The tension on the spring 22 is varied by the nut 24 on the adjusting screw 23.

The dust which is produced by the sanding drum 11 from the surface being sanded is collected in a suitable bag 25 through a gooseneck 26 in a manner well known in the art. The gooseneck 26 may readily be connected or disconnected from the body housing 10. The gooseneck 26 has one end secured to the bag 25 and, as shown most clearly in FIG. 4, the oppositely disposed end has at least one slot 27 extending through a wall thereof radially outward along the axis of the tube. The slotted end of the gooseneck 26 is inserted in a suitable aperture 28 in the body housing 10, which has a slightly smaller diameter than the outside diameter of the gooseneck 26 in order that the end of the gooseneck 26 is slightly compressed to retain the gooseneck therein. The outer end of the aperture 28 is flush with the surface of the body housing 10 and when the gooseneck is removed from the aperture 28, a substantially smooth surface results having no protuberances therefrom.

As shown most clearly in FIG. 3, the handle 19 is detachably secured to the body housing 10 by inserting the lower end of the handle into a suitable aperture 29 in the body housing 10. As shown in FIG. 1, the aperture 29 is located along the centerline of the housing 10 but is angularly disposed to the vertical axis of the housing. Thus, the handle 19, when inserted in the aperture 29, is positioned at the proper operating angle for the walking attendant.

The handle 19 is locked in the aperture 29 by means of a locking member 30 which is mounted in a threaded aperture 31 in the housing 10 which, as shown in FIG. 3, is angularly disposed to the aperture 29 and consequently the locking member 30 is angularly disposed to the handle 19 when it is inserted in the aperture 29. A hand knob 32 is carried on the outermost end of the locking member 30 while the centrally disposed portion 33 has threads formed thereon which are in mating engagement with the threads in the aperture 31. The innermost end of the locking member 30 has a rounded portion 34 that is received in an opening 35 in the handle 19 when the locking member 30 is moved inwardly relative to the body housing 10. The locking member 30 not only prevents the handle 19 from being withdrawn from the aperture 29, but also properly positions the shifting lever 20 relative to the control arm 17.

Referring to FIG. 6 there is shown the means for detachably securing the push rod 18 to the control arm 17 which comprises a pin 36 on the rod 18 that is in selective contact with a pin engaging portion 37 of the control arm 17. The pin 36 is mounted on the opposite end of the rod 18 from the push handle 19 and extends outwardly therefrom on both sides in a direction normal to the axis of the rod 18. The pin 36 is adjustably secured to the end of the rod 18 by means of a cylindrical member 38 that is threadably secured to the lower end of the rod 18 and locked in position by means of a nut 39. A bifurcated member 40 which receives a connecting pin 41 that passes through the lever 20 is likewise threadably secured to the upper end of the rod 18 and is similarly locked in position. By selectively turning members 38 and 39 the effective length of the rod 18 can be altered.

On the opposite end of the cylindrical member 38 from the threaded end of the rod 18 there is formed an ear 42 having substantially parallel surfaces. The pin 36 extends through the portion 42 substantially normal to the surfaces thereof and is rigidly secured thereto.

The portion 37 engages the pin 36 by receiving it in a recess 43 formed in a pair of spaced yokes 44. The inner side wall 45 of the recess 43 which is located nearest the surface to be sanded is adapted to contact one side of the pin 36 when the lever 20 is moved downward to rotate the wheels 14 away from the floor. An oppositely disposed wall 46 of the recess 43 is adapted to contact the oppositely disposed side of the pin 36 as shown in FIG. 6 when the lever is moved in the upward direction to lower the wheels 14.

Sidewise motion of the rod 18 is prevented by the engagement of the surfaces of the ear 42 with the facing surfaces of the spaced yokes 44. Movement of the pin 36 out of the recess 43 is prevented by means of a locking hook 47 that is pivotally secured to the end of the pin engaging portion 37 by means of a suitable screw 48. The hook 47 has a slot 49 therein which engages the pin 36 when it is inserted in recess 43. The rotational movement of the hook 47 is limited by the curved end 50 which engages the upwardly facing surface of the outwardly spaced yoke 44 at its downward extremity of rotational movement.

An important feature of the invention resides in the fact that the push rod 18 can be disconnected from the control arm 17 most readily only when the sanding drum 11 is lifted out of contact with the floor, thereby decreasing any possibility of unintentional disconnecting during the actual sanding operation. As shown in FIG. 5, the recess 43 in the yokes 44 has a circular path of movement A as the truck 13 rotates about the cross shaft 16. Likewise, the pin 36 has a circular path of movement B about the connecting pin 41 on the lever 20 when the lever is in its uppermost position. The pin 36 also has a circular path of movement C about the connecting pin 41 when the lever 20 is in its lowermost position. As shown most clearly in FIG. 5, the circular path of movement A of the recess 43 is tangential to the circular path of movement B of the pin 36 only when the lever 20 is in its uppermost position, wherein the sanding drum is lifted out of floor contact.

I claim:

1. In a portable sander of the type having a horizontally-extending sanding drum normally in contact with a surface to be sanded and exerting pressure thereagainst, a rear wheel in contact with the surface to be sanded, intermediate wheels positioned between said drum and said rear wheel in contact with the surface, the weight of said sander being carried by said drum, said rear wheel, and said intermediate wheels, a pivotally-mounted truck for mounting said intermediate wheels for movement toward and away from the surface, resilient means for applying force on said truck to move said intermediate wheels in the direction of said surface, an elongated tubular member for mounting a dust bag, a handle, a force-transmitting member carried by said handle and said truck to rotate said truck to move said intermediate wheels toward and away from the surface, and shifting means on said handle adjacent one end of said force-transmitting member for moving said force-transmitting member in a first direction toward the surface and in a second direction away from the surface, the improvement comprising means for selectively securing said force-transmitting member to said truck comprising a pin carried by said force-transmitting member at the opposite end thereof from said shifting means and extending outwardly from said force-transmitting member, a pin-engaging member mounted on said truck and having yoke means secured thereto for selectively engaging and disengaging said pin when said opposite end of said force-transmitting member is moved in a direction substantially normal to the first and second directions, a wall of said recess adapted to contact a side of said pin when said force-transmitting member is moved in the first direction and an oppositely-disposed wall of said recess adapted to contact an oppositely-disposed side of said pin when said force-transmitting member is moved in the second direction, and means for selectively locking said pin in said recess.

2. A portable sander as claimed in claim 1, wherein the shifting means includes means for mounting the force transmitting means for pivotal movement whereby the pin is movable in a substantially circular path when out of the recess in the pin engaging member, and said circular path is tangent to the path of movement of the recess only when said force transmitting means is moved to its limit in the second direction.

3. A portable sander of the type having a horizontally-extending sanding drum normally in contact with a surface to be sanded and exerting pressure thereagainst, a rear wheel in contact with said surface to be sanded, intermediate wheels positioned between said drum and said rear wheel in contact with said surface, the weight of said sander being carried by said drum, said rear wheel and said intermediate wheels, a pivotally-mounted truck for mounting said intermediate wheels for movement toward and away from said surface, an elongated tubular member for mounting a dustbag, a handle, a force-transmitting member carried by said handle and said truck to rotate said truck to move said intermediate wheels toward and away from said surface, shifting means on said handle adjacent one end of said force-transmitting member for moving said force-transmitting member in a first direction toward the surface and in a second direction away from the surface, the improvement comprising a housing having a plurality of apertures therein for mounting said tubular member and said handle, means for selectively securing said tubular member in one of said apertures, means for selectively securing said handle in another of said apertures, and means for selectively connecting said force-transmitting member to said truck whereby said housing is free of extending appurtenances when said tubular member and said handle are removed from the associated apertures and said force-transmitting member is detached from said truck, said selectively connecting means including a pin affixed in an end of one of said force-transmitting member and said truck, yoke means on the other of said force-transmitting member and said truck for selectively engaging and disengaging said pin, said yoke being positioned so that said pin can be disconnected only when said intermediate wheels are in their lower position in contact with the surface and the sanding drum is out of contact with the surface, and manually-operable means for selectively locking said pin in said yoke means.

References Cited in the file of this patent

UNITED STATES PATENTS

| | | |
|---|---|---|
| 1,818,954 | Jacobson et al. | Aug. 11, 1931 |
| 1,934,814 | Myers | Mar. 14, 1933 |
| 1,974,136 | Emmons | Sept. 18, 1934 |
| 2,001,099 | Holt | May 14, 1935 |
| 2,118,818 | Okum | May 31, 1938 |
| 2,224,437 | La Salle | Dec. 10, 1940 |

FOREIGN PATENTS

| | | |
|---|---|---|
| 59,875 | Germany | Mar. 20, 1891 |
| 240,668 | Great Britain | Oct. 8, 1925 |
| 1,009,765 | France | Mar. 12, 1952 |